(12) United States Patent
Olsson et al.

(10) Patent No.: US 8,976,085 B2
(45) Date of Patent: Mar. 10, 2015

(54) WEARABLE DEVICE WITH INPUT AND OUTPUT STRUCTURES

(75) Inventors: Maj Isabelle Olsson, San Francisco, CA (US); Mitchell Joseph Heinrich, San Francisco, CA (US); Sebastian Thrun, Los Altos Hills, CA (US); Sergey Brin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/353,445

(22) Filed: Jan. 19, 2012

(65) Prior Publication Data

US 2013/0188080 A1    Jul. 25, 2013

(51) Int. Cl.
*G09G 5/00* (2006.01)

(52) U.S. Cl.
USPC .......... 345/7; 345/8; 345/9; 348/115; 359/630

(58) Field of Classification Search
CPC ....... G06F 3/011; G06F 3/013; G06F 3/0484; G06F 3/005; G06F 3/0304; G06F 3/0346; G06F 3/012; G06F 3/017; G06F 3/0482; G06F 3/0483; G06F 2003/04806; G06F 3/048; G06F 3/04815; G06F 19/3437; G02B 23/215; G02B 27/0093; G02B 27/01
USPC ........................................................ 345/7–9
See application file for complete search history.

(56) References Cited

U.S. PATENT DOCUMENTS

| | | | |
|---|---|---|---|
| 4,867,551 A | 9/1989 | Perera | |
| D327,079 S | 6/1992 | Allen | |
| D334,557 S | 4/1993 | Hunter et al. | |
| D337,320 S | 7/1993 | Hunter et al. | |
| 5,589,846 A | 12/1996 | Kobayashi | |
| 5,757,339 A | 5/1998 | Williams et al. | |
| D402,651 S | 12/1998 | Depay et al. | |
| 5,991,085 A | 11/1999 | Rallison et al. | |
| 6,034,653 A * | 3/2000 | Robertson et al. | 345/8 |
| D436,960 S | 1/2001 | Budd et al. | |
| 6,181,304 B1 * | 1/2001 | Robinson et al. | 345/8 |
| 6,204,974 B1 * | 3/2001 | Spitzer | 359/630 |

(Continued)

FOREIGN PATENT DOCUMENTS

WO    2010092904 A1    8/2010

OTHER PUBLICATIONS

International Search Report and Written Opinion for Application No. PCT/US2013/022124 dated Jun. 26, 2013.

(Continued)

*Primary Examiner* — Duc Dinh
(74) *Attorney, Agent, or Firm* — Lerner, David, Littenberg, Krumholz & Mentlik, LLP

(57) ABSTRACT

An electronic device includes a band configured to be worn on the head of a user. The band has a central portion and first and second temple portions extending therefrom. The central portion is configured to contact a portion of the face of a user, and the temple portions are configured to contact portions of the head of the user near ears thereof. An operational unit having a display element is affixed to the first temple portion and includes a housing having an arm defining a longitudinal axis. The housing also includes an elbow portion defining a display end that supports the display element such that it extends along a display axis angled with respect to the longitudinal axis and such that the display element is positionable over an eye of the user. Image generating means are disposed within the housing for generating an image presentable on the display element.

26 Claims, 12 Drawing Sheets

(56) References Cited

U.S. PATENT DOCUMENTS

| | | | |
|---|---|---|---|
| 6,388,640 B1* | 5/2002 | Chigira et al. | 345/8 |
| D512,985 S | 12/2005 | Travers et al. | |
| 7,158,096 B1 | 1/2007 | Spitzer | |
| D559,250 S | 1/2008 | Pombo | |
| D565,082 S | 3/2008 | McClure et al. | |
| D602,064 S | 10/2009 | Mitsui et al. | |
| 7,631,968 B1 | 12/2009 | Dobson et al. | |
| 7,648,236 B1 | 1/2010 | Dobson | |
| 7,663,805 B2 | 2/2010 | Zaloum et al. | |
| 7,675,683 B2 | 3/2010 | Dobson et al. | |
| 7,843,403 B2 | 11/2010 | Spitzer | |
| 8,000,000 B2 | 8/2011 | Greenberg et al. | |
| D646,316 S | 10/2011 | Zhao | |
| 8,539,374 B2* | 9/2013 | Okaro et al. | 715/810 |
| 8,593,795 B1 | 11/2013 | Chi et al. | |
| 2002/0041152 A1* | 4/2002 | Burrows | 313/506 |
| 2003/0210228 A1* | 11/2003 | Ebersole et al. | 345/157 |
| 2004/0061663 A1* | 4/2004 | Reynolds et al. | 345/8 |
| 2005/0219152 A1* | 10/2005 | Budd et al. | 345/8 |
| 2006/0017657 A1* | 1/2006 | Yamasaki | 345/8 |
| 2006/0119539 A1 | 6/2006 | Kato et al. | |
| 2009/0201460 A1 | 8/2009 | Blum et al. | |
| 2010/0045928 A1 | 2/2010 | Levy | |
| 2010/0073262 A1 | 3/2010 | Matsumoto | |
| 2010/0110368 A1* | 5/2010 | Chaum | 351/158 |
| 2010/0149073 A1 | 6/2010 | Chaum et al. | |
| 2010/0157433 A1 | 6/2010 | Mukawa et al. | |
| 2010/0188314 A1 | 7/2010 | Miyake et al. | |
| 2011/0213664 A1 | 9/2011 | Osterhout et al. | |
| 2011/0221672 A1* | 9/2011 | Osterhout et al. | 345/156 |

OTHER PUBLICATIONS

International Search Report and Written Opinion for Application No. PCT/US2013/022124 dated Jan. 18, 2013.

International Search Report & Written Opinion for Application No. PCT/US2012/050690 dated Feb. 28, 2013.

* cited by examiner

WEARABLE DEVICE WITH INPUT AND OUTPUT STRUCTURES

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Accordingly, further advances in wearable devices including displays have been needed.

BRIEF SUMMARY

An aspect of the present disclosure relates to an electronic device including a band configured to be worn on the head of a user. The band has a central portion and first and second temple portions extending from opposing sides of the central portion. The central portion is configured to contact a portion of the face of a user, and the temple portions are configured to contact portions of the head of the user near respective ears thereof. The device also includes an operational unit having a display element and a housing having an arm portion affixed to the first temple portion of the band and defining a longitudinal axis. The housing also includes an elbow portion defining a display end of the housing that supports the display element such that the display element extends along a display axis that is angled with respect to the longitudinal axis and such that the display element is positionable over an eye of the user. The operational unit also has image generating means disposed within the housing and configured for generating an image presentable to the user on the display element. The display element can be a generally transparent prism configured to combine the image presentable to the user thereon with a user view through the display element.

The operational unit can further include an input device affixed to the housing and configured for receiving from the user an input associated with a function that is related to information that is presentable on the display element. In an example, the housing of the operational unit can define an outer wall, and the input device can include touch-sensitive circuitry disposed within the housing adjacent to the outer wall, the touch-sensitive circuitry being configured to receive a touch input from the user through the outer wall. In such an example, the touch-sensitive circuitry can be disposed behind a portion of the outer wall, and an outside surface of the outer wall can includes a texture defined therein in an area that overlies the touch-sensitive circuitry.

The display axis can be angled at between about 80° and 110° with respect to the longitudinal axis. Further, in an example, the arm portion and the elbow portion can be discrete elements rotatably affixed to each other about a rotation axis substantially parallel to the display axis such that the display element is adjustable toward and away from a brow area of the user's head by rotation of the elbow portion relative to the arm portion. In such an example, the rotation axis can be positionable such that it aligns with a focal center of the user's eye. The display element can include a planar viewing surface, and the rotation of the display element about the focal center of the user's eye can be such that the planar viewing surface remains substantially normal to a line extending therefrom to the focal center through a range of adjustment of the display element.

The arm portion of the housing can include a first track element that is configured to slideably attach with a second track element included on one of the first and second temple portions of the band. In such an example, the slidable engagement between the first and second track elements can be configured to allow adjustment of the display element toward and away from an eye of the user.

At least one electronic element can be disposed within an interior cavity of the band. In an example, the at least one electronic element can be electrically connected with the image generating means of the operational unit.

Each of the first and second temple portions can respectively define a first end and a second end in an embodiment wherein the band is of a flexible structure. In such an embodiment, the first end and second end can be moveable toward and away from each other to provide a securing force of the first and second temple portions against the respective portions of the head of the user. In an example, the band can include a flexible outer portion disposed around a more rigid and resiliently flexible structural member. In another example, the band can include a resiliently flexible structural shell that at least partially surrounds a pliable inner member. The pliable inner member can include an inner surface defining the portions of the band that are configured for contact with the face of the user and the head of the user. The structural shell can be disposed on a side of the band opposite the inner surface of the pliable member.

The portion of the face that the central portion is configured to contact can be a portion of the forehead of the user disposed toward the brow thereof. Alternatively, in an embodiment wherein the central portion of the band further includes a nosepiece depending therefrom, the portion of the face of the user that the central portion is configured to contact can be a portion of the nose of the user, and the nosepiece can makes such contact.

The device can further include a camera having a lens thereof. The camera can be attached to the operational unit such that the lens of the camera is exposed on the housing within the elbow portion thereof and is directed substantially parallel to the longitudinal axis. The operational unit can further include a button configured to receive from the user an input to direct the device to capture an image using the camera. The button can be positioned on the housing such that it is configured to be activated by the user by applying a pinching motion to the housing including contact with the button. The camera can alternatively be attached to the band such that the lens of the camera is exposed thereon and is directed substantially parallel to the longitudinal axis. The device can further include a plurality of cameras having respective lenses thereof, the cameras being attached to the band in an array thereof extending over a length of the band.

The device can further include an audio output device affixed to one of the temple portions of the band configured for contact with a portion of one of the user's ears. The output can further be configured to deliver an audio output of the device to the ear.

The band can further include a flexible retention member connected between the first and second temple portions at ends thereof opposite the central portion. The flexible retention member can define an interior cavity with conductive connections disposed therein. The conductive connections can be configured for connecting with a battery and to supply current from the battery to the image generating means.

Another aspect of the present disclosure relates to an electronic device including a band configured to be worn on the head of a user. The band includes a central portion and first and second temple portions extending from opposing sides of the central portion to respective ends thereof. The central portion is configured to contact a portion of the face of a user and the temple portions are configured to contact portions of the head of the user near respective ears thereof. The band further includes an electronics housing affixed on the end of the first temple portion and having a portion that is configured to extend around at least a portion of the respective ear of the user. The electronics housing contains an electronic element therein. The device further includes an operational unit including a display element. The operational unit also includes a housing having an arm portion affixed to the first temple portion of the band and defining a longitudinal axis. The housing also has an elbow portion defining a display end of the housing and supporting the display element such that the display element extends along a display axis that is angled with respect to the longitudinal axis and such that the display element is positionable over an eye of the user. The operational unit also includes image generating means disposed within the housing and configured for generating an image presentable to the user on the display element. The image generating means are electrically connected with the electronic element of the band. The operational unit can further include an input device affixed to the housing and connected with the at least one electronic element of the band.

The electronic element can include conductive connections configured for connecting with a battery to supply current from the battery to the image generating means. Additionally or alternatively, the electronic element can include electronic circuitry configured to perform a function associated with the device.

The operational unit can be positioned on a first side of the respective ear of the user such that it has a center of mass at a point disposed on the first side of the ear, and wherein the electronics housing is configured to extend around at least a portion of the same ear of the user, the electronics housing being configured to have a center of mass at a point disposed on a second side of the ear of the user. The electronics housing can be further configured such that an overall weight of the device, when being worn by the user, is distributed among the portion of the face of the user and the ear of the user such that a greater portion of the overall weight is applied to the ear.

Another aspect of the present disclosure relates to an electronic device including a band configured to be worn on the head of a user. The band includes a central portion and first and second temple portions extending from opposing sides of the central portion. The central portion is configured to contact a portion of the face of a user and the temple portions are configured to contact portions of the head of the user near respective ears thereof. The device also includes an operational unit having a display element and a housing. The housing has an arm portion affixed to the band and defining a longitudinal axis and an outer wall. The housing also has an elbow portion defining a display end of the housing and supporting the display element such that the display element extends along a display axis that is angled with respect to the longitudinal axis and such that the display element is positionable over an eye of the user. T Additionally or alternatively, the electronic element can include electronic circuitry configured to perform a function associated with the device. Image generating means are disposed within the housing and are configured for generating an image presentable to the user on the display element. Touch-sensitive circuitry is disposed within the housing adjacent to the outer wall. The touch-sensitive circuitry is configured to receive a touch input from the user through the outer wall, the input being associated with a function that is related to information presentable on the display element.

DETAILED DESCRIPTION

Figure 1:
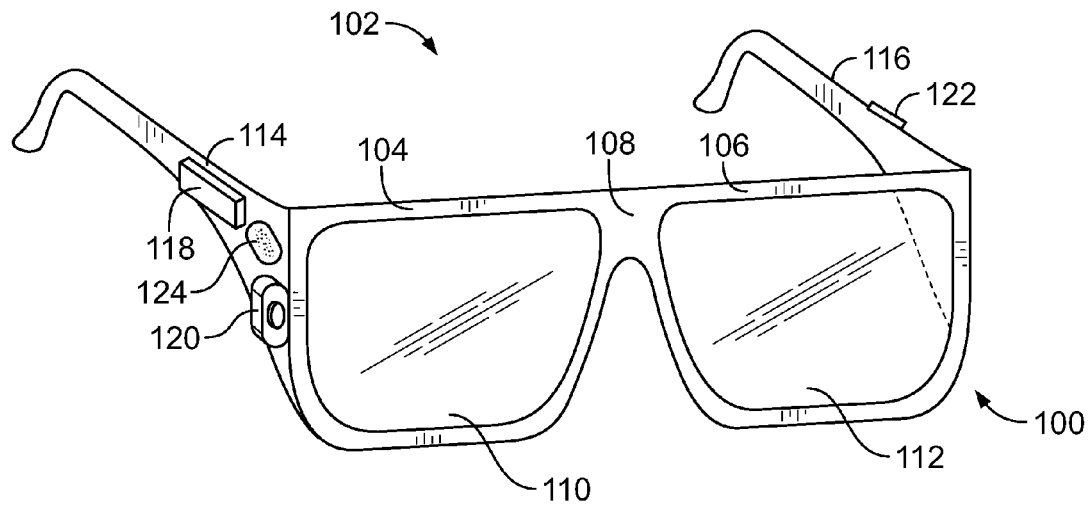
FIG. 1 shows an exemplary system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened 20 surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
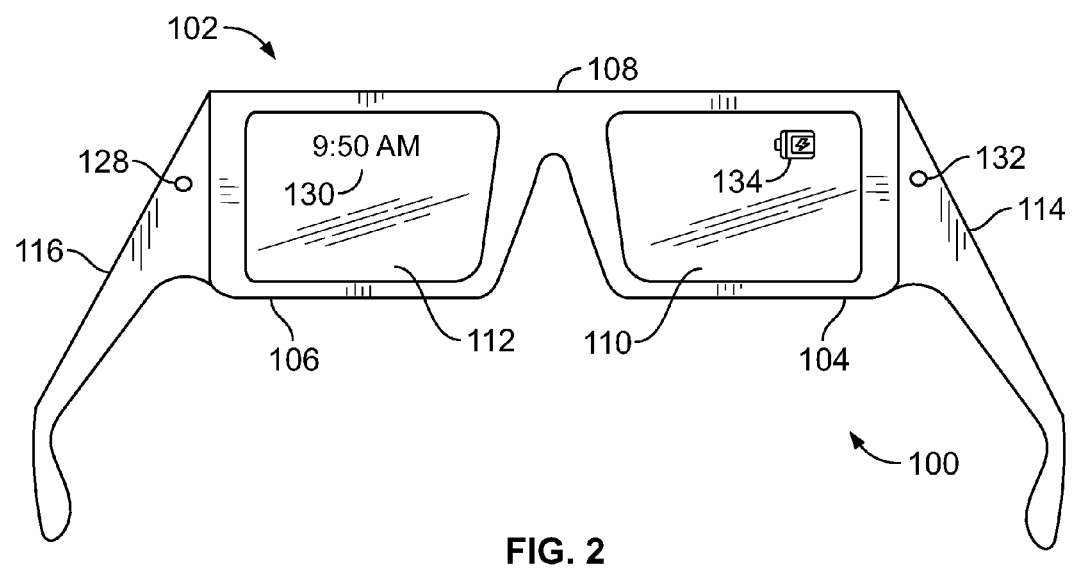
FIG. 2 shows an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
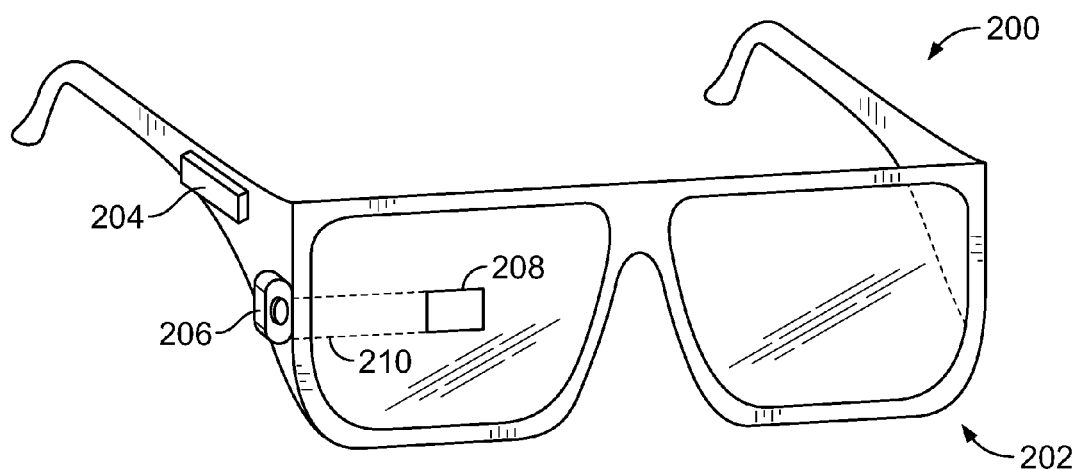
FIG. 3A shows an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2.

The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
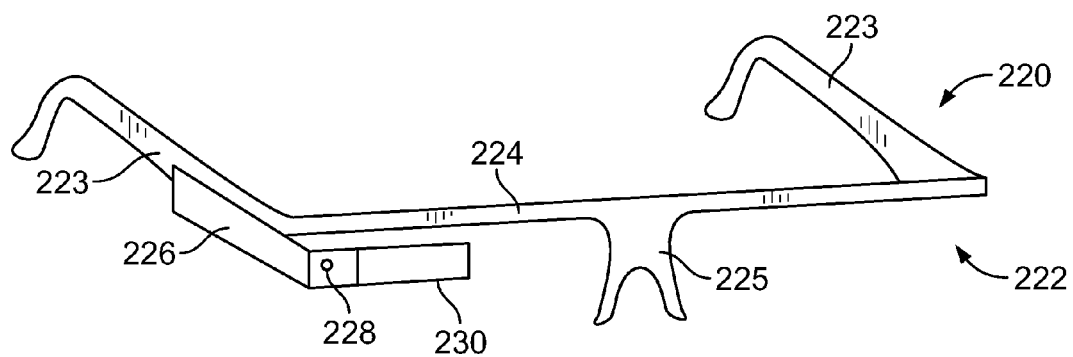
FIG. 3B shows an example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
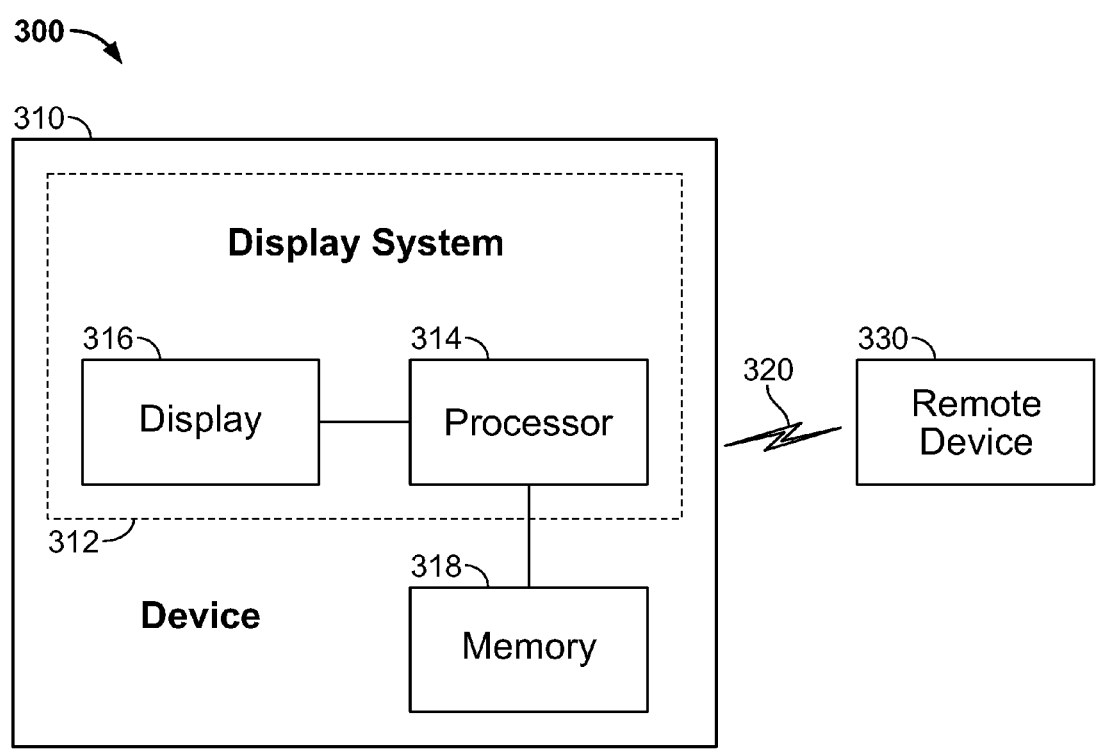
FIG. 4 shows an example system for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
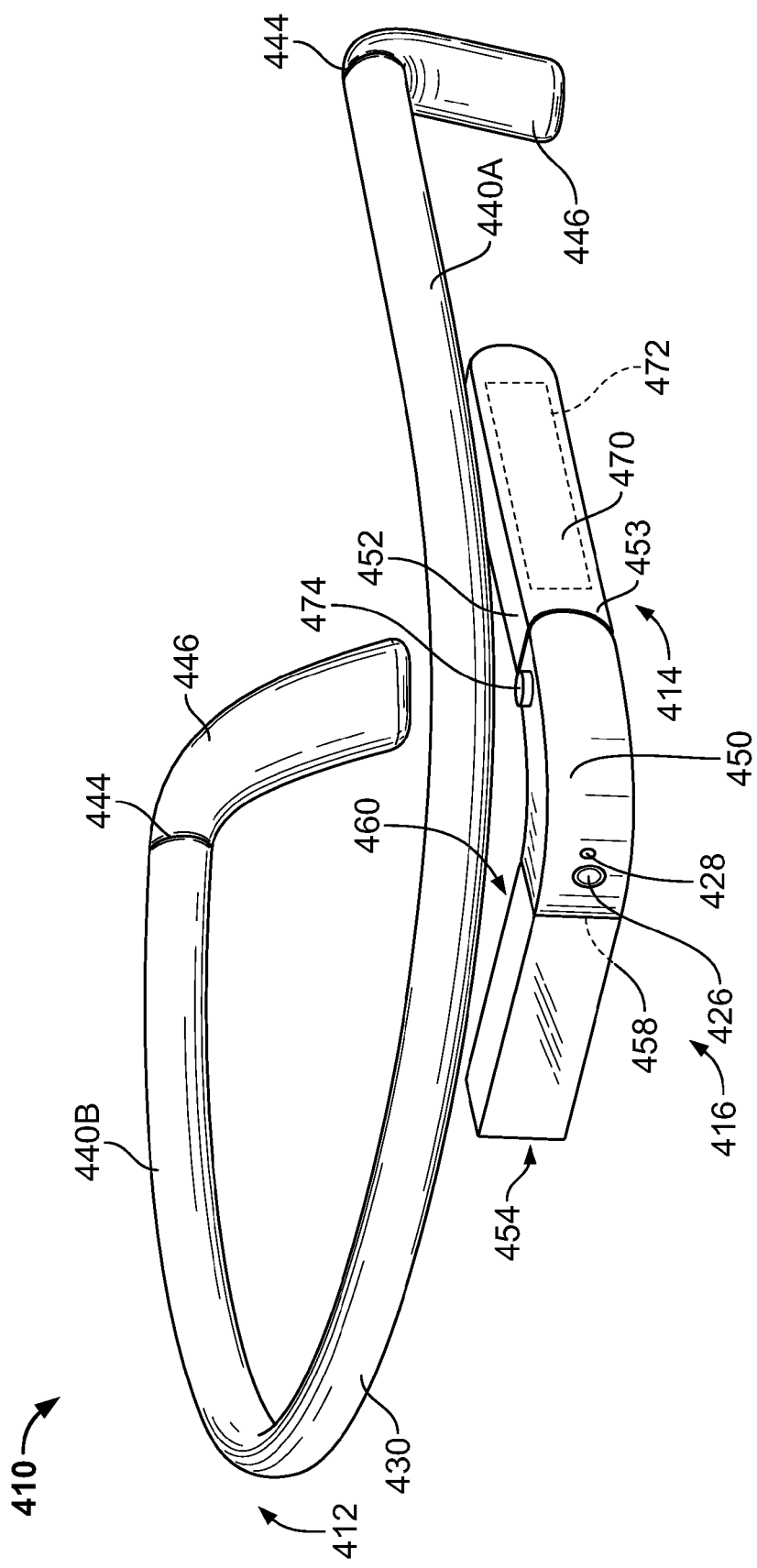
FIG. 5 shows a wearable computer device according to an embodiment of the present disclosure.
Figure 6:
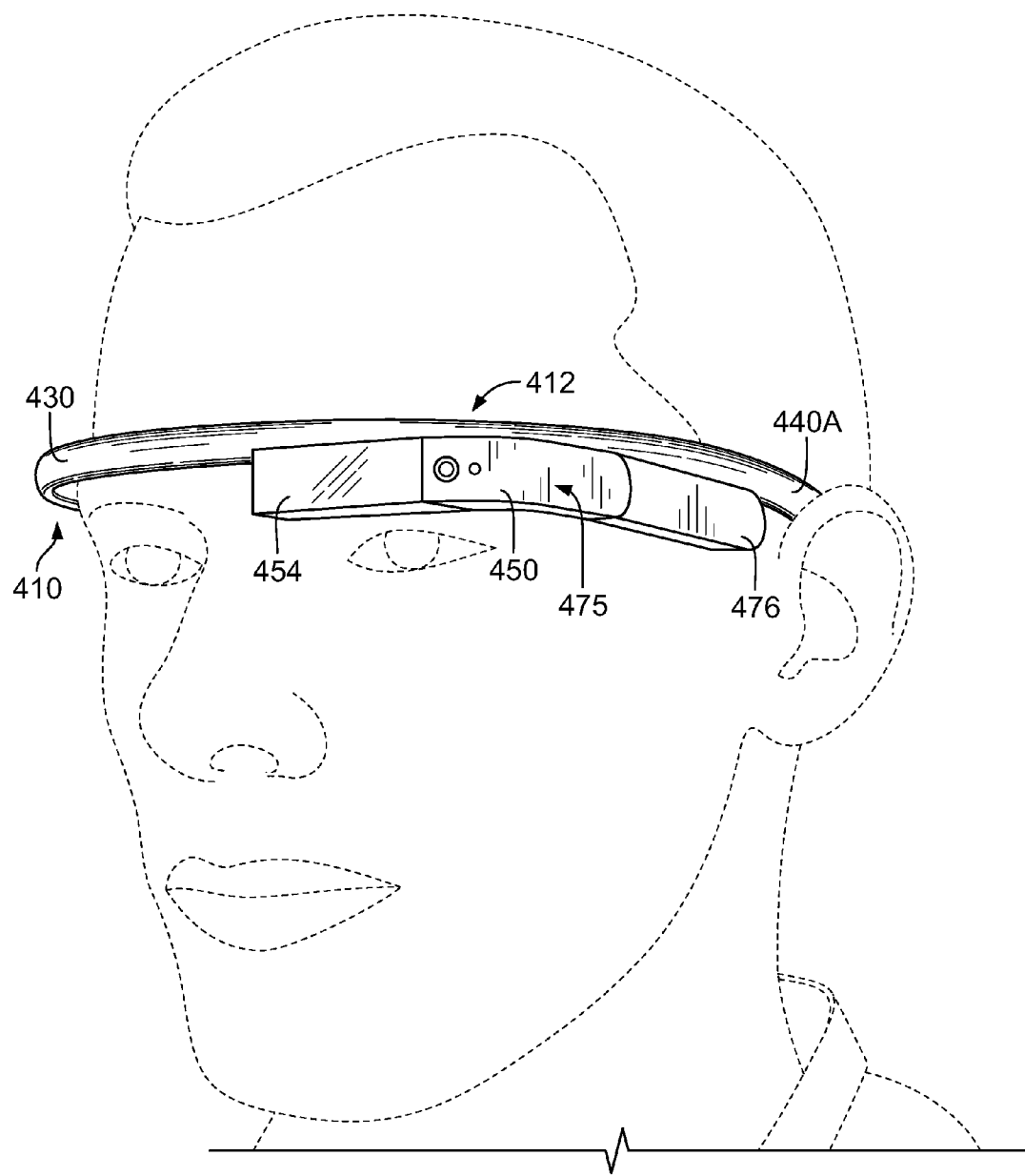
FIG. 6 shows the assembly of FIG. 7 being worn on the head of a user.

FIGS. 5-15, which do not adhere to the same numbering scheme used in FIGS. 1-4, illustrate an embodiment of a wearable device that can implement the various systems discussed above with reference to FIGS. 1-4. FIG. 5 shows an embodiment of a device 410 that is wearable on the head of the user (as shown in FIG. 6). As will be described in greater detail below, device 410 includes a band 412 that provides the desired fit of device 410 on a user's head. Device 410 further includes a boom 414 that extends from a portion of band 412 to a free end 416 thereof that includes a display element 454. Boom 414 is affixed to band 412 such that when device 410 is properly worn by a user display 454 of boom 414 can be positioned adjacent the user's eye for making an image presented thereon viewable by the user. In this manner, the boom 414 is configured as a unit of the device 410 that carries out at least one operation of the device 410, namely presenting an image to the user. Additional operations can also be carried out by boom 414, which can also include an input device in the form of a touch-based input 470 that is accessible to the user to receive a touch input from the user to execute a control function of the device assembly 410 or a function of another electronic device that is connected or in communication with device assembly 410.

Band 412 is shown in FIG. 5 as having a unitary configuration that generally includes a central portion 430 with arms 440A,440B extending away from opposite sides of the central portion 430. FIG. 6 shows an example of one position in which band 412 can be worn on a user's head. As shown, band 412 can be configured to fit on the head of a user with central portion 430 positioned over a portion of the face of the user. Specifically, FIG. 6 shows central portion 430 in contact with the brow of the user such as by extending along a portion of the brow in contact therewith. In general, the user's face can be considered any portion with in the area defined vertically from the user's chin to the top of the forehead and horizontally from ear to ear. In the embodiment of FIGS. 5 and 6, the portion of the brow that central portion 430 makes contact with can vary, both depending on the size and shape of central portion 430 and the shape of the particular user's head. In an embodiment, the central portion 430 makes contact with enough of the brow to maintain the position of central portion 430 thereon, depending on the fit on the user's head achieved by other features of band 412. Band 412 can be made of or otherwise be covered by a high-friction material, such as rubber, at least in the desired area for such contact. In an embodiment, central portion 430 is in an arched shape to accommodate the generally rounded shape of a human forehead. Band 412 can be constructed of a flexible material to allow central portion 430 to bend in response to different individual brow or head shapes.

Arms 440A,440B can be configured to contact the head of the user along respective temples or in the area of respective ears of the user. Arms 440A,440B include respective free ends 444 opposite central portion 430. Free ends 444 can be positioned to be located near the ear of a user when wearing device assembly 410. Ear portions 446 can be affixed to or integrally formed with the free ends 444 of the arms 440A, 440B. As shown in FIG. 5 ear portions 446 can include an arched or curved form, as shown in the figures, such that they bend behind a portion of the back of the user's ear. As with eyeglasses, the particular shape of ear portions 446 can vary in many ways including the amount by which they bend, the distance around the ear which they extend and the amount of contact, if any, actually maintained with the outside of the ear. Arms 440 can be structured to appropriately position ear portions 446 relative to central portion 430 to achieve an appropriate fit for a user or a selection of different users. The shape of arms 440 can, accordingly, depend on the size and shape of central portion 430. For example, arms 440 can extend substantially rearward from central portion 430 substantially perpendicular thereto and can be substantially straight. In other embodiments, arms 440 can be angled inward, outward, upward, or downward relative to central portion 430 and can further be curved in any direction (or multiple directions) to achieve a desired fit or aesthetic quality.

As mentioned previously, earpieces 446 can be integrally formed with band arms 440 or can be separate elements that can be pre-assembled with arms 440. Alternatively, a number of different earpieces 446 can be provided that can be removably attached to ends 444 of arms 440 according to fit or the user's preferences. In such configurations, earpieces 446 can be made of different materials or material combinations than the remainder of band 412. In a further embodiment, earpieces 446 can extend substantially in-line with arms 440 or can extend inward therefrom, rather than downward, to a position where they rest over the ear on a topmost area thereof but do not hook around the ear. In such an embodiment earpieces 446 or arms 440 can be configured to exert a pressure against the side of the user's head to at least partially retain frame 412 on the user's head using friction generated through the pressure.

Band 412 can be made from a resiliently flexible material or combination of materials. Such a construction can permit arms, including ends 444 thereof to flex outwardly away from each other to accommodate heads of different sizes. Further, the structure can be configured so that at a resting, or unflexed, position (such as when not being worn) band 412 is somewhat smaller than necessary to accommodate the smallest size head (within a given range of head sizes) that band 412 is intended to be worn on. This may require some degree of flexing by band 412 when worn, resulting in band 412 applying a force against the user's head due to its tendency to return to its undersized resting position. Such a force can help retain band 412 on the user's head, with or without the further retention provided by earpieces 446. As with central portion 430, at least a portion of the arms 440, such as the areas thereof that make contact with the user's head, can be made from or otherwise coated with a rubber or another high-friction material. The use of rubber or the like in these contact areas can also increase the comfort to the user by spreading out the contact more evenly. Such a structure can achieve at least three points of contact with the user's head, which can give a desired level of stability to the assembly 410, when worn. Band 412 can be further configured to provide additional points of contact, such as two points of contact within central portion 430 or continuous contact along the user's head. These types of fit can also result from the particular shape of the user's head.

Suitable materials for band 412 to achieve the above-described characteristics include various plastics, which can be overmolded, co-molded, or insert molded with rubber, such as thermoplastic elastomer ("TPE") materials in the desired contact areas or covering any relatively harder plastic entirely. Additionally, rubber or TPE can be molded or assembled over metal, such as spring steel or the like. In such an embodiment, a high yield strength metal, such as spring steel can be used to prevent plastic (or permanent) deformation of the desired shape of band 412. Similarly, earpieces 446 can be made from plastic or metal and can be at least partially coated with or covered by rubber or TPE elements for increased friction or comfort.

In variations of the band described above, central portion 430 and arms 440A and 440B can each be separate elements that can be affixed together. In one embodiment, arms 440A, 440B can be affixed to central portion 430 by hinges to allow the structure to be folded for storage or transportation. Such hinges can be spring-loaded to permit flexure therein instead of in central portion 430 or arms 440A,440B.

In the embodiment shown, boom 414 includes a housing 452 that extends from band 412 at an arm portion 476 that can be elongated and to extend away from band 412 to an elbow portion 450 that supports display 454 at an angle relative to arm 476 (which is shown having an elongated shape so as to define a longitudinal axis therethrough). As shown in the figures, display 454, which is also elongated and generally defines a display axis, can extend relative to arm portion 476 at an angle that can range from about 80° to about 110°. In an embodiment, display 454 is angled with respect to arm portion 476 at approximately 90°. Elbow portion 450 can be curved, as shown in the figures, or can include a bend formed by a sharp corner or can be configured such that display 454 projects directly outwardly from near arm portion 476 at the desired angle. In an embodiment, the image source associated with display 454 and its related circuitry can be held within housing 452 in elbow portion 450 thereof. Touch-based input can be positioned within arm portion 476 such that, when display 454 is positioned over a user's eye, arm portion 476 is positioned in a position that extends over the user's temple adjacent that eye.

In the embodiment shown, display 454 is in the form of a generally-transparent prism that is configured to overlay or combine with the user's sight an image generated by electronic display components that are positioned within the housing 452. Such a prism can be structured to receive a projected image in a receiving side 458 and to make that image visible to a user by looking into a viewing side 460 of display 454. This can be done by configuring display 454 with a specific shape and or material characteristics. In the embodiment of FIG. 5 the receiving side 458 of display 454 is adjacent to or within housing 452 such that the electronic components inside housing 452 can contain a video projector structured to project the desired video image into receiving side 458 of prism 454. Such projectors can include an image source such as LCD, CRT, and OLED displays and a lens, if needed, for focusing the image on an appropriate area of prism 454. The electronic components associated with display 454 can also include control circuitry for causing the projector to generate the desired image based on a video signal received thereby. Other types of displays and image sources are discussed above and can also be incorporated into boom 414. Further, a display can be in the form of a video screen consisting of, for example, a transparent substrate. In such an example, the image generating means can be circuitry for a LCD display, a CRT display or the like positioned directly behind the screen such that the overall display is not transparent. The housing of the boom can extend behind the display and the image generating means to enclose the image generating means in such an embodiment.

The receiving surface 458 of display 454 can be perpendicular to the viewing surface 460 of prism 454 such that a transparent prism can be used to combine the projected image with the view of the environment surrounding the wearer of the device. This allows the user to observe both the surrounding environment and the image projected into prism 454. The prism 454 and the display electronics can be configured to present an opaque or semi-transparent image, or combinations thereof, to achieve various desired image combinations.

Boom 414 is attached to band 412 in a manner to properly position display 450 at a distance away from the user's eye. As shown in the embodiment of FIG. 5, arm portion 476 is configured to be positioned over a temple of the user's head when being worn. In such a position, arm portion 476 is positioned adjacent a corresponding arm 440A or 440B of band 412. Accordingly, boom 414 can be attached to band 412 at a location between the arm portion 476 of the boom 414 and a corresponding arm 440A or 440B of band 412. In an example, arm portion 476 can be affixed to and extend away from band 412 along a longitudinal axis of the arm portion 476 that is tangent to a portion of the arm 440A or 440B at the point of attachment. Arm portion 476 can, thus, diverge from band 412 as the band 412 curves inward to contact the user's brow along the central portion 430 thereof and as arm portion 476 continues to extend forward to extend along its longitudinal axis. This can allow for at least approximately appropriate positioning of display 454 over the user's eye on the side of the arm 440A or 440B to which the boom 414 is attached given the angle at which elbow portion 450 positions display 454 relative to arm 476 of housing 452.

Boom 414 can attach to band 412 using any one of a number of different structures. In one embodiment, boom 414 can be integrally formed with band 412 at a converging point therebetween. In a similar example, a portion of the housing 452 of boom 414 (such as an inside portion thereof that is positioned adjacent the user's head when being worn) can be integrally formed with the band 412. In such an example, the remaining portions of housing 452 can then be assembled therewith using screws, snap-fit or press-fit structures, adhesive, ultrasonic welding or the like. In other embodiments, boom 414 can be attached to band 412 using screws or other fasteners or snap-fit or press-fit structures located on mutually-engaging portions thereof. Further structures are possible that allow for some degree of adjustment between the boom 414 and the band 412. For example, a sliding joint can be used to attach boom 414 to band 412. Such a sliding joint can be in the form of a dovetail or similar joint within an element that serves as a track or guide and another element that engages the track or guide. Rotating joints are also possible and can be implemented using the previously-discussed screw or snap-fit structures. Other attachment structures are discussed below with reference to further embodiments of the present disclosure.

It is also noted that, although the embodiment of FIG. 5 shows a boom 414 that is attached to band 412 such that it is positioned over the left eye of a user when being worn, other similar embodiments are possible in which a mirror-image of boom 414 can be attached on an opposite side of band 412 to make it positionable over the right eye of the user. Depending on the application of device assembly 410 or individual user preferences, it may be desirable to position boom 414 on a particular side of the user's head. For example, a right-handed person may prefer having the boom 414 on the right side of her head to make interaction with touch-based input 470 easier. In another example, a person may prefer to have the display 454 over a dominant eye for easier interaction with elements presented on display 454 or over a non-dominant eye to make it easier to shift his focus away from elements presented on display 454 when engaged in other activities.

As shown in FIGS. 5 and 6, boom 414 can be attached to or otherwise formed with band 412 such that boom 414 is positioned beneath band 412 when in a position as when worn on a user's head. This configuration can be advantageous due to the relative positions desired for display 454 and central portion 430 of band 412. In particular, with central portion 430 in a position over the brow of the user, it may be desired to have display 454 positioned vertically below central portion 430 such that it is in at least a portion of the user's line of sight. Accordingly, in an embodiment this positioning is achieved by attaching boom 414 to band 412 such that boom 414 is vertically beneath band 412, with exception made for any interacting attachment elements of band 412 or boom 414. Other arrangements are possible, such as boom 414 attaching to band 412 in an overlapping manner, with boom 414 positioned to the outside of band 412 at the point of attachment. In such an arrangement, boom 414 can angle downward, as necessary, to appropriately position display 454 relative to the user's eye. This arrangement can also be used to provide an assembly 410 that can be "flipped" to be worn with display 454 over either eye, with boom 414 being appropriately rotated to be positioned beneath band 412 regardless of the orientation of band 412 on the user's head.

As mentioned previously, boom 414 can be made adjustable with respect to band 412 such that the user can wear band 412 on his or her head in a comfortable position and can then make adjustments to place display 454 in a desired or appropriately functional position. For example, the user may desire to position display directly in her line of sight (both vertically and horizontally) or may desire to have display 454 positioned above, below, or to the outside of his line of sight. Such positioning may vary depending on how the user is using device 410, making on-the-fly adjustments useful for some applications. In other embodiments, such adjustment can be made within boom 414 itself, allowing a fixed attachment between boom 414 and band 412, while still permitting similar adjustments.

Figure 7A:
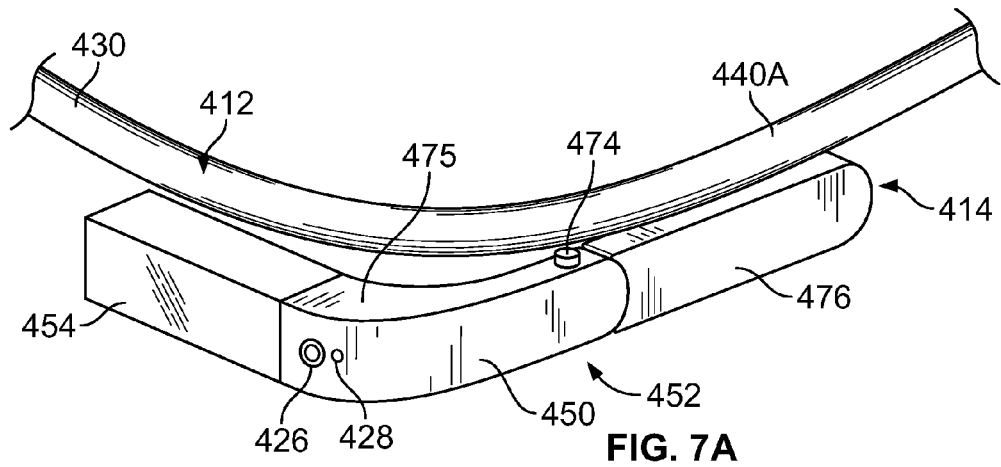
FIG. 7A-7C show the device of FIG. 5 in exemplary adjustment configurations thereof.

In the embodiment of FIGS. 5-7, housing 452 is divided into a display housing 475 and an arm housing 476. As shown, display housing 475 defines elbow portion 450 and has display 454 mounted thereon. Arm housing 476 substantially defines the arm portion of boom 414 and can include touch-based input 470, which can be a discrete element or can be an operable surface 474 of housing 452, as described above. In an embodiment, the display portion 475 and arm portion 476 of housing 452 can be covered by a compliant outer layer (not shown). This outer layer can be made from a rubber material, for example, and can cover any joint between the two housing portions to give boom 414 a clean and uniform look. A rotating joint between display portion 475 and arm portion 476 can be used and can be formed by a separate element such as a pin or by integrally-formed features such as a post and a mating hole that can snap together. Additionally, an armature wire or a ball-and-socket joint can be assembled between the display portion 475 and the arm portion 476 to allow adjustment along additional axes. Such joints can also be covered by a compliant outer layer.

Figure 7B:
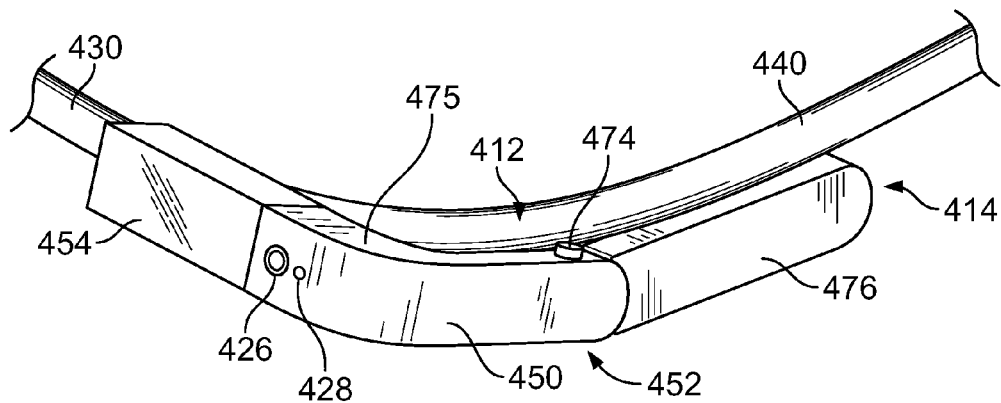
Figure 7C:
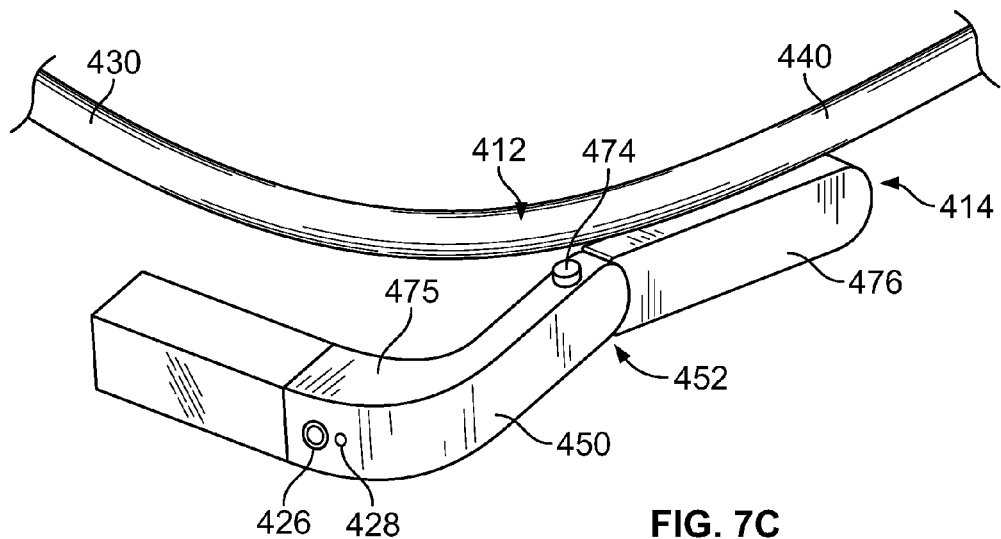

In this embodiment, display housing 475 can be rotatably affixed to arm housing 476. Boom 414 can then be attached to band 412 by any of the structures discussed herein. The rotation of display housing 475 can implement an additional or alternative form of adjustment for the position of display 454 relative to the user's eye. As shown in FIG. 7B, display housing 475 can be rotated upward relative to arm housing 476. Further, as shown in FIG. 7C, display housing 475 can be rotated downward relative to arm housing 476. In an embodiment, the point of rotation 484 between display housing 475 and arm housing 476 can be positioned near the focal center of a user's eye. This can be approximated based on predetermined non-adjustable attachment structures on bands of varying sizes, as discussed above, or can be done though forward- and backward-adjustable attachment structures, such as those described above and also below with respect to FIG. 9.

Figure 8A:
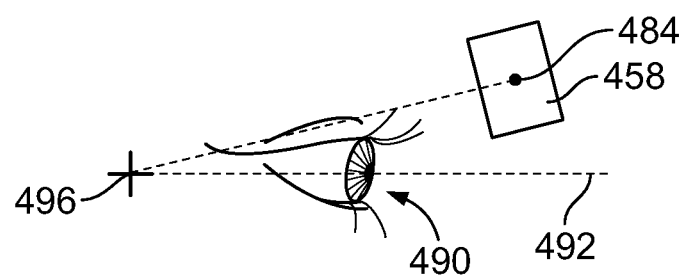
FIGS. 8A and 8B are schematic drawings illustrating aspects of the device of FIGS. 7A-C.
Figure 8B:
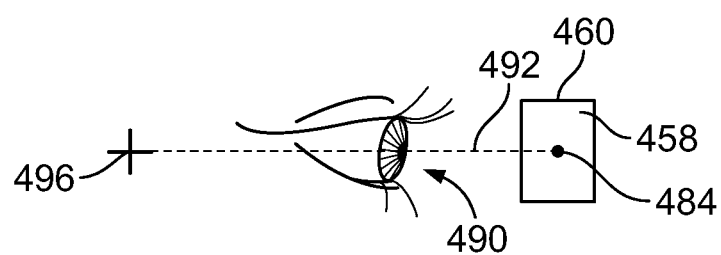

As shown in FIGS. 8A and B, in certain structures of display 454, such as certain display configurations (including the use of some types of prisms), it can be beneficial to orient display 454 such that viewing surface 460 is normal to a line from the image location within display 454 to the focal center of the user's eye. By allowing rotation of display housing 475 and, thus, display 454 to rotate relative arm housing 476, the display 454 can be positioned in an optimal angle for viewing by users with different facial structures and different preferences for the horizontal or vertical position of display 454 or band 412. FIG. 8A shows display 554 at a location above the horizontal center 492 of the user's eye 490. Display 454 is pivoted or otherwise rotated about axis 484 that extends in a lateral direction relative to the user's face (in and out of the page of FIG. 8A) such that surface 460 is perpendicular to a line 494 extending between surface 460 and the focal center 496 of the user's eye 490. It is noted that the diagram shown in FIG. 8A is only an example and different users can have different locations of their eye's focal center. FIG. 8B shows display 454 positioned vertically near the horizontal center 492 of the user's eye with display rotated accordingly for optimal viewing by the user, as described above.

As discussed above, an input device in the form of a touch-based input 470 is also desirably included in boom 414. Touch-based input 470 can be a touchpad or trackpad-type device configured to sense at least one of a position and a movement of a finger via capacitive sensing, resistance sensing, or a surface acoustic wave process, among other possibilities. Touch-based input 470 can further be capable of sensing finger movement in a direction parallel or planar to a surface thereof, in a direction normal to the surface, or both, and may also be capable of sensing a level of pressure applied. Touch-based input 470 can be formed having an outer layer of one or more insulating, or dielectric, layers that can be opaque, translucent, or transparent and an inner layer of one or more conducting layers that can be opaque, transparent, or translucent.

In an embodiment, the outer layer of the touch-based input 470 can be a portion of an outer wall 453 of housing 452. This can provide a seamless or uniform incorporation of touch-based input 470 into housing 452. The housing can define an interior cavity for containing the inner layer of the touch-based input 470 and any electrical structures, such as control circuitry, associated therewith. The outer layer of the touch-based input 470 can include the entire wall 453 or a selected operable area 472 in the form of one or more touch-surfaces 470 thereof, as dictated by the size, shape, and position of the inner layer of the touch-based input 470. If a portion of the housing is to be used as the outer layer of the touch-based input 470, then the housing 452 can be made of a dielectric material such as plastic. In an alternative embodiment, the touch-based input can be a discrete element that is mounted in an opening in the housing 452 that includes its own dielectric outer layer, separate from wall 453 to define the operable area within a window or opening through wall 453 in a manner similar to a touchpad on a laptop computer.

In the embodiment shown, touch-based input 470 is positioned on arm portion 476 and defines a vertical plane that overlies a portion of the side of the user's head. Accordingly, touch-based input 470 may not be visible to a user of the assembly 410, when it is being worn. To help the user identify any operable areas 472 of touch-based input 470 the housing 476 can be formed to have a texture provided by a raised, indented, or roughened surface so as to provide tactile feedback to a user when the user's finger contacts the touch surface 472. Such a texture can define the boundaries of the operable area 472, can be consistent through the operable area 472, or can vary along horizontal and vertical lengths of the operable area 472 to give the user feedback as to the location of a finger contacting operable area 472.

Touch-based input 470 can also include additional operable areas 472 on wall 453 or on other portions of housing 452, such as the top or bottom surfaces thereof. This can be achieved by positioning capacitive sensor layers, for example, beneath the selected housing surfaces. In other embodiments, additional touch-based inputs can be provided in different locations of boom 413 such as on elbow portion 450. Each of the touch-based inputs 470 can be operated independently, and can provide different functions. Additionally, housing 452 can include additional input structures, such as a button 474 that can provide additional functionality for boom 414, including implementing a lock or sleep feature or allowing a user to toggle the power for boom 414 between on and off states.

Touch-based input 470, or another type of input, can be used to provide a control function that is executed by boom 414, such as by an on-board CPU or a CPU mounted to or within an associated wearable structure, or by a remote device, such as a smartphone or a laptop computer. In an embodiment information related to the control function is viewable by the user on display 454. In one example, the control function is the selection of a menu item. In such an example, a menu with a list of options can be presented on display 454. The user can move a cursor or can scroll through highlighted options by predetermined movement of a finger along touch-based input 470 and can confirm the selection by a different movement, the acceptance of the selection being indicated by the display. Examples of menu item selections can include whether to answer or decline an incoming call on a remotely-linked smartphone or to scroll or zoom-in on a map presented in display.

Additional input structures can be included in boom 414. These can include a camera 426 and a sensor 428, as shown in FIG. 5. The camera can be used to take picture or record a video at the user's discretion. The camera can also be used by the device to obtain an image of the user's view of his or her environment to use in implementing augmented reality functionality. The sensor 428 can be, for example a light sensor that can be used by firmware or software associated with the camera 426. As shown in FIG. 5, the camera and sensor can be included in a housing 452 positioned within the elbow portion 450 and facing in a direction substantially perpendicular to viewing surface 460 of display 454. In such an arrangement, camera 426 is positioned to face in a direction along the user's line of sight, and sensor 428 is positioned to sense light within the view of the camera 426. Other locations for the camera 426 and sensor 428 are also possible. In an example, a camera or multiple cameras can be positioned in band 412. Such an arrangement can include a single camera positioned near the central portion 430 such as in a position configured to be located between the user's eyes when device 410 is being worn. In another arrangement, a camera can be positioned on band 412 such that each camera is aligned with a respective eye of the user when device 410 is being worn. In yet another arrangement, a series of cameras can be spaced apart at regular intervals along a length of band 412, such as across central portion 430. In such an arrangement, sensors can be 428 be interspersed between cameras 426. Similarly, sensors can be positioned in band 412 near any cameras positioned therein in any other locations discussed.

In an embodiment, button 474 can be configured to receive an input from the user to direct device 410 to capture an image using camera 426 or one of multiple cameras of device 410. In an embodiment, the control circuitry or software within device 410 can allow the user to select one or a plurality of multiple cameras with which to capture an image or "take a picture" before receiving an input using button 474 to actually capture the image using the selected camera. Button 474 can be positioned on boom 414 along the top surface 467 of housing 452. Such positioning can allow for the user to grasp housing 452, for example, using the user's thumb positioned opposite from top surface 467, with the user's index finger to press on button 474 in a pinching motion. This action can be similar to the motion used to activate a shutter in a conventional camera (e.g. a point-and-shoot or an SLR camera) or a motion used by people to mimic such a motion, making the use of button 474 to take a picture with camera 474 more intuitive to a user. Additionally, the positioning of button 474 to be pressed in the above-described pinching motion can result in a more stable activation of button 474, wherein the user's thumb provides support for boom 414 when button 474 is pressed. Such stability can be further enhanced by configuring button 474 with a low activation pressure such that the force applied thereto is low enough to not cause boom 414 to move during image capture.

As mentioned previously, housing 452 can contain electronic circuitry such as the circuitry for touch based input 470. In addition housing 452 can include control circuitry for the image source associated with display 454, the camera 426, or the sensor 428, or one or more circuit boards including a processor to control display 454, touch based input 470 or to perform other functions for boom 414. Housing 452 can further include a power source, such as a battery to power the other circuitry. Additionally, housing 452 can include memory, a microprocessor or communications devices, such as cellular, short-range wireless (e.g. Bluetooth), or WiFi circuitry for connection to a remote device. Additionally, any such circuitry can be included in band 414 such as in at least one of the earpieces 446, for example in an internal cavity thereof. As shown in FIG. 7, earpiece 446 can be configured to be positioned behind or over the ear of the user while being worn. Earpiece 446 can be further configured to contact a portion of the user's head to help secure the position of device assembly 410. Earpiece 446 can be configured to include a battery or multiple batteries of various forms, such as AAA, AA, or 9-volt style batteries. The battery can also be a rechargeable battery such as a lithium-ion or nickel-cadmium battery and can be removable by the user or can be permanent or semi-permanent. Earpiece 446 can also include a port (not shown) that can be used to connect device assembly 410 to a power source to recharge a battery without removal thereof or to connect device 410 to a remote device for communication therewith, such as described above, or to update or install software or firmware included in the memory of device 410.

Earpiece 446 can be configured and positioned to provide a balancing weight to that of boom 414. Boom 414 is positioned forward of the user's ear, which can cause a portion of its weight to be supported over the brow of the user. By adding weight behind the user's ear (or shifting weight to behind the user's ear) in the form of earpiece 446, the ear becomes a fulcrum about which the weight of boom 414 is balanced against that of the earpiece 446. This can remove some of the weight on the user's brow, giving a more comfortable, and possibly a more secure fit with reduced potential slipping of central portion 430 downward on the user's brow. The components within earpiece 446, such as a battery or various control circuitry can be arranged to contribute to a desired weight distribution for device assembly 410. For example, heavier components, such as a battery, can be placed toward or away from boom on arm 440A to adjust the weight distribution. In an embodiment, a majority of the weight can be carried by the ear of the user, but some weight can still be carried by the brow in order to give the device a secure feel and to keep the central portion 430 in a desired position on the brow to maintain a desired position for display 454. In an embodiment, between 55% and 90% of the weight of device assembly 410 can be carried by the user's ear.

In a commercial setting, a number of different devices similar to device 410 can be made available having respective bands 412 that are configured to fit different ranges of head sizes, such as "small", "medium", and "large". Similarly, variations for left-eye boom position and right eye boom positions within the various sizes can also be made available. Further embodiments are also possible wherein various booms and bands are interchangeable and can be individually sold. Further variations of devices can be made available with bands offering different fit styles (such as with earpieces or without or in varying shapes) or colors.

In the present example, a single boom 414 is shown extending from band 412. Alternatively, two booms could be included, with one affixed on each arm 440A and 440B of band 412 and corresponding to each eye of the user. As a further alternative, a single display 454 could be used with a prism or other structure configured to extend over both eyes of the user for displaying an image viewable by both eyes.

Figure 9:
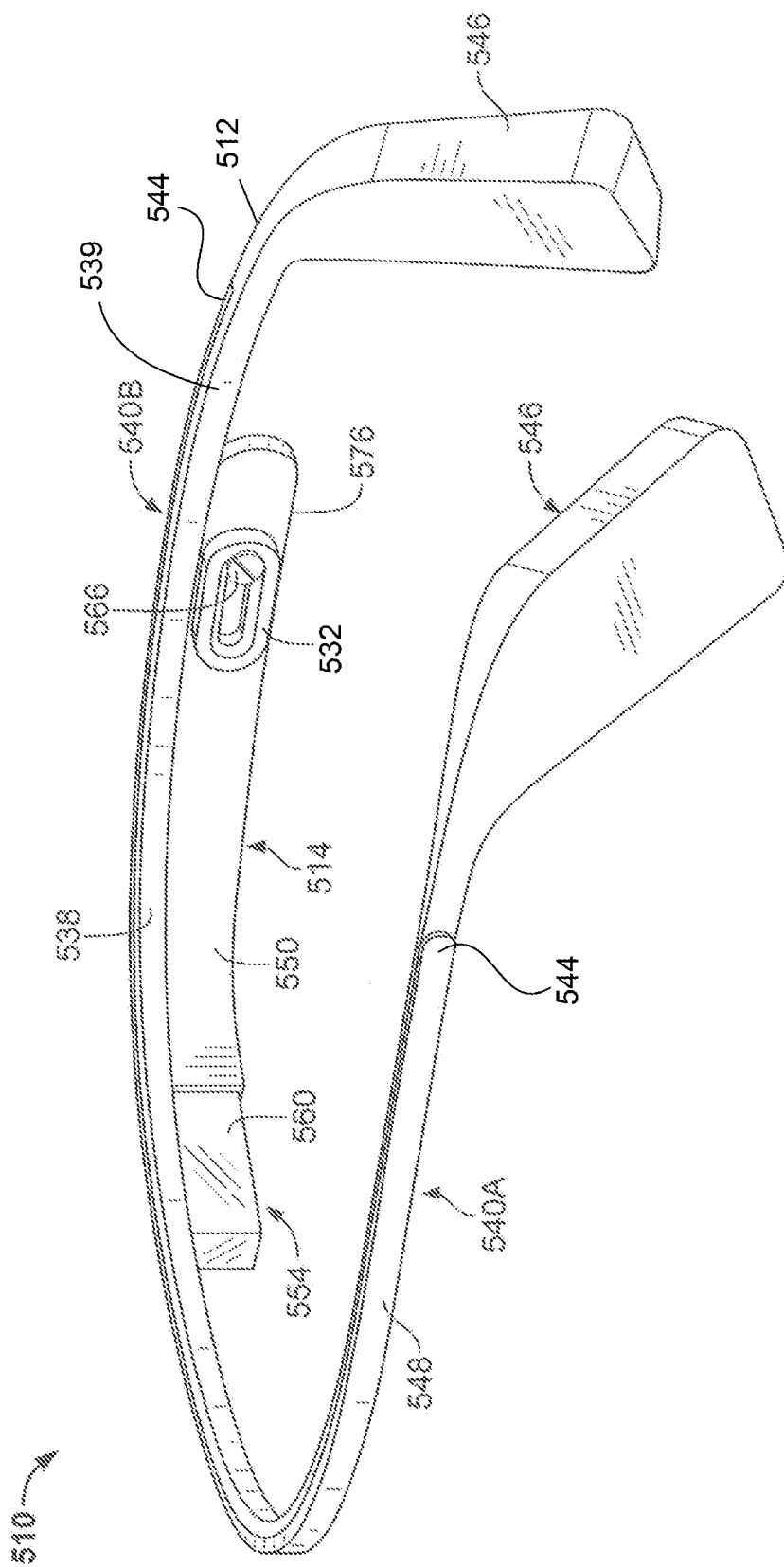
FIG. 9 shows an alternative embodiment of a wearable computer device according to another embodiment of the present disclosure.
Figure 10:
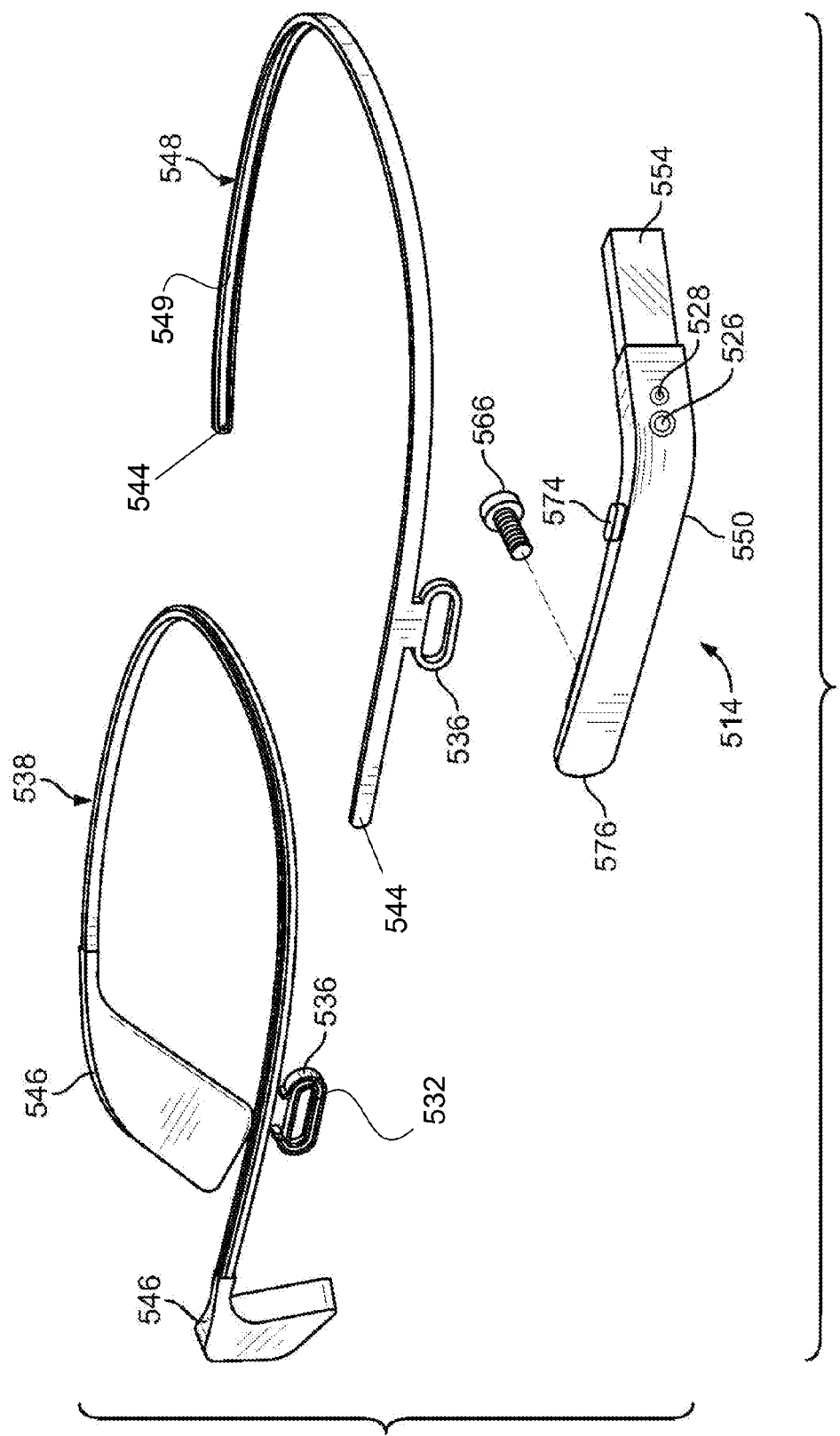
FIG. 10 shows an exploded view of the device of FIG. 9.

In the embodiment shown in FIG. 9, device 510 has a band 512 that includes a compliant inner portion 538 and a resilient outer portion 548. This arrangement is further illustrated in the exploded view of FIG. 10. Inner portion 538 can include any portions of the band 512 that are intended to contact the user's head. In the particular embodiment shown, inner portion 538 can define the entire inner surface 539 of band 512 to ensure that the compliant material of inner portion makes contact with the user's head regardless of the area of band 512 along which contact is made with the user's head. Inner portion 538 can be made of any material that can provide a degree of compliance to enhance the comfort of the fit of band 512 on the user's head while being able to retain its general shape. Acceptable materials include various foams, such as foam rubber, neoprene, natural or synthetic leather, and various fabrics. In an embodiment, inner portion 530 is made from an injection-molded or cast TPE. The compliance of the material of inner portion 530 can be measured by the durometer of the material. In an example, inner portion 438 can be made from a TPE having a durometer of between 50 and 70. Inner portion 538 can also be formed having a hollow passage therethrough or a channel formed therein opposite inner surface 539. Such a passage or channel can be used to route any wiring associated with boom 514. For example, in an embodiment a battery (not show) can be housed in one of the earpieces 546 of band 512 that can be connected with the internal components of boom 514 to provide power therefor. This connection can be made by wired routed through a channel or hollow passage through inner portion 538.

Outer portion 548 of band 512 can be made of a resiliently flexible material such as metal or plastic. In general, the nature of such a material should be such that outer portion 548 can maintain the desired shape for band 512 while allowing some flexibility so that band 512 can expand to fit on a user's head while applying a comfortable pressure thereto to help retain band 512 on the user's head. In some embodiments, outer portion 548 can be elastically deformable within a range that will allow it to be worn as such on a user's head and plastically deformable above the elastically deformable range to allow the user to make adjustments to the shape of band 548. In other embodiments, outer portion 548 is elastically deformable up to a sufficiently high threshold that a user is sufficiently unable to permanently alter the shape of band 512. Acceptable materials for outer portion 548 include metals such as aluminum, nickel, titanium (including grade 5 titanium), various steels (including spring steel, stainless steel or the like), or alloys including these and other metals. The thickness of outer portion 548 can be adjusted, depending on the material used, to give the desired flexibility characteristics.

As shown in FIG. 9, inner portion 538 can have a profile such that it at least partially fits within a channel 549 formed by outer portion 548. In the example shown, inner portion 538 can be sized to fit within channel 549 along a relatively narrow portion thereof opposite inside surface 539. Inner portion 538 can then extend inward past outer portion 548 and can be relatively wider along such a portion, which can include inner surface 539. Channel 549 can be configured to also accept any wiring of band 512 therein or to close a partially open channel formed in inner portion 539 to hold such wiring.

Further, in the embodiment shown in FIG. 9, earpieces 546 can be integrally formed with inner portion 538 and can extend beyond ends 544 of outer portion 548. In these embodiments, inner portion 538 can include internal support within the portions thereof that form earpieces 546. Such internal support can include electronics housings that can contain batteries or other electronic circuitry associated with device 510. The internal support can also include resilient members such as spring elements (not shown) to help provide flexion of band 512 and retention pressure against a wearer's head. Such spring elements can also be plastically deformable to allow for user adjustment of the earpieces 546. Lengths of armature wire can be used to provide such characteristics. Any internal support within earpieces 546 can extend into the area of inner portion 538 that is within outer portion 548 to provide additional support therefor.

FIG. 9 shows an example of a boom 514 that is in a configuration to fit over a right eye of a user in a general form that is a mirror image of a form such at that of FIG. 5 that is configured for use over a user's left eye. As with the embodiment of FIGS. 5-7, the embodiment of FIG. 10A can be mirrored or inverted in a version that can be worn over the user's left eye.

In the embodiment shown in FIG. 9, the attachment feature 532 of band 512 includes a track 536 that extends along a length of arm 540A. The attachment between boom 514 and band 512 can be configured to allow adjustment between the relative positions of band 512 and boom 514. Boom 514 includes an attachment feature 532 including a screw 566, the shank of which fits within track 536 with the head of screw 566 extending outward along the body of the attachment feature 532. In such an arrangement, boom 514 can be affixed to attachment feature 532 using screw 566 such that boom 514 can be moved forward and backward relative to band 512 by sliding screw 566 within track 536. Such adjustment can provide various forms of "eye relief" such as by compensating for different eye positions such as for users with deep-set eyes or with eyes positioned relatively close to brow. Additionally, the eye relief provided by the forward and backward adjustability of attachment 532 can allow display 554 to be positioned clear of the user's eyelashes including those of users with relatively long eyelashes. Screw 566 can then be tightened into housing 552 to secure the position of boom 514 relative to band 512. Housing 552 can be configured to permit some rotation of boom 514 relative to attachment portion 532 such that the rotational position of boom 514 can also be fixed by tightening screw 566 into housing 552. This attachment can also incorporate a spring (not shown) or the like positioned between housing 552 and attachment feature 532 such that boom 514 is biased away therefrom. This can allow the lateral position of boom 514, and thus display 554, to be adjusted by tightening screw 566, which can draw housing 552 closer to attachment feature 532. In either arrangement, boom 514 can be such that it can be disassembled from band 512 by loosening screw 566 until it is removed from housing 552. In other embodiments, the screw 566 can have a stopper or similar structure on the end thereof that is within housing 552 such that screw 566 cannot be removed and, thus boom 514 cannot be detached from band 512. Track 536 can include conductive features such as exposed wire segments or traces partially embedded therein that can align with further conductive features positioned on housing 552 of boom 514 to allow connection between electronic elements in the band 512 and the electronic components (including the image source or touch-based input 570) in boom 514. In other embodiments, an external wire (not shown) can extend out from band 512 and plug into an outlet (not shown) on boom 514 to achieve a desired electrical connection therebetween. Band 512 can include additional wires that run through at least a portion thereof to further connect such components that may be located remotely from each other.

Figure 11:
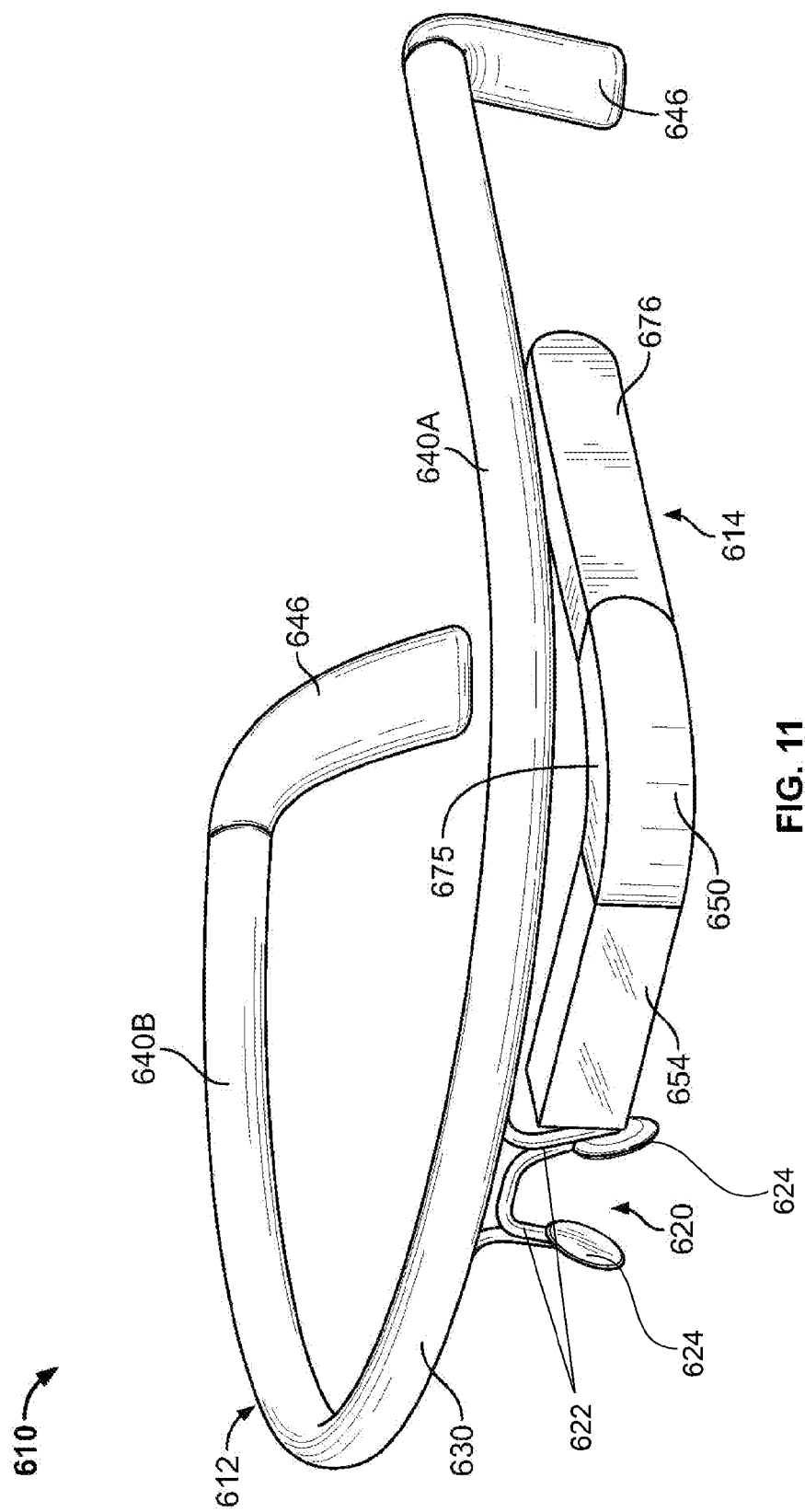
FIG. 11 shows an alternative embodiment of a wearable computer device according to another embodiment of the present disclosure.

FIG. 11 shows an alternative embodiment of device 610 in which band 612 includes a nosebridge 620 affixed to central portion 630 thereof to provide support for central portion 630 on the nose of a wearer, rather than the wearer's brow. In the embodiment shown, nosebridge 620 includes a pair of bridge arms 622 that extend from the central portion 630. In the view of the embodiment of device assembly 610 shown in FIG. 11, bridge arms 622 extend in a downward direction from central portion 630. As in other figures, the orientation of device assembly 610 shown in FIG. 12 generally corresponds to the orientation of device 610 when being worn by a user when the user's head is in a neutral, upright position. The description of bridge arms 622 extending downward from central portion 630 is made in such a reference frame and is done for purposes of the present description. Discussion of any other relative reference directions is also made for similar purposes and none are intended to be limiting with respect to the present disclosure, unless explicitly stated.

Bridge arms 622 can include respective pads 624 thereon, which can be positioned to rest on parts of the nose of the wearer. Pads 624 can be made of a material that is softer than arms 622 for purposes of comfort. Additionally the material that pads 624 are made from can be flexible or have a texture that prevents slippage along the surface of the user's nose. Bridge arms 622 can be flexible to further provide a comfortable fit and or grip on the user's nose. Further, bridge arms 622 can be deformably bendable and repositionable so that the position of pads 624 can be changed to best fit the user.

This can include movement closer together or farther apart or fore and aft relative to central portion 630, which can adjust the height of central portion 630 and, accordingly, the position of boom 614 and its display 654 relative to the user's eye. Further adjustment of display and other structures thereof can be similar to those in the embodiments described above, as can the structures used to affix boom 614 to band 612. In other embodiments, structures similar to arms and pads can be integrally formed with central portion 630 and can be structured such that larger or smaller areas of the nosebridge 620 contact the nose of the user, compared to the embodiment shown. A device 610 of this type can allow for weight distribution configurations (as discussed above with respect to FIGS. 5-7) in which more weight can be distributed on the front side of the user's ear. In an example, in such a configuration, up to about 60% of the weight of device 610 can be supported by a wearer's nose through contact with nosebridge 620.

Figure 12:
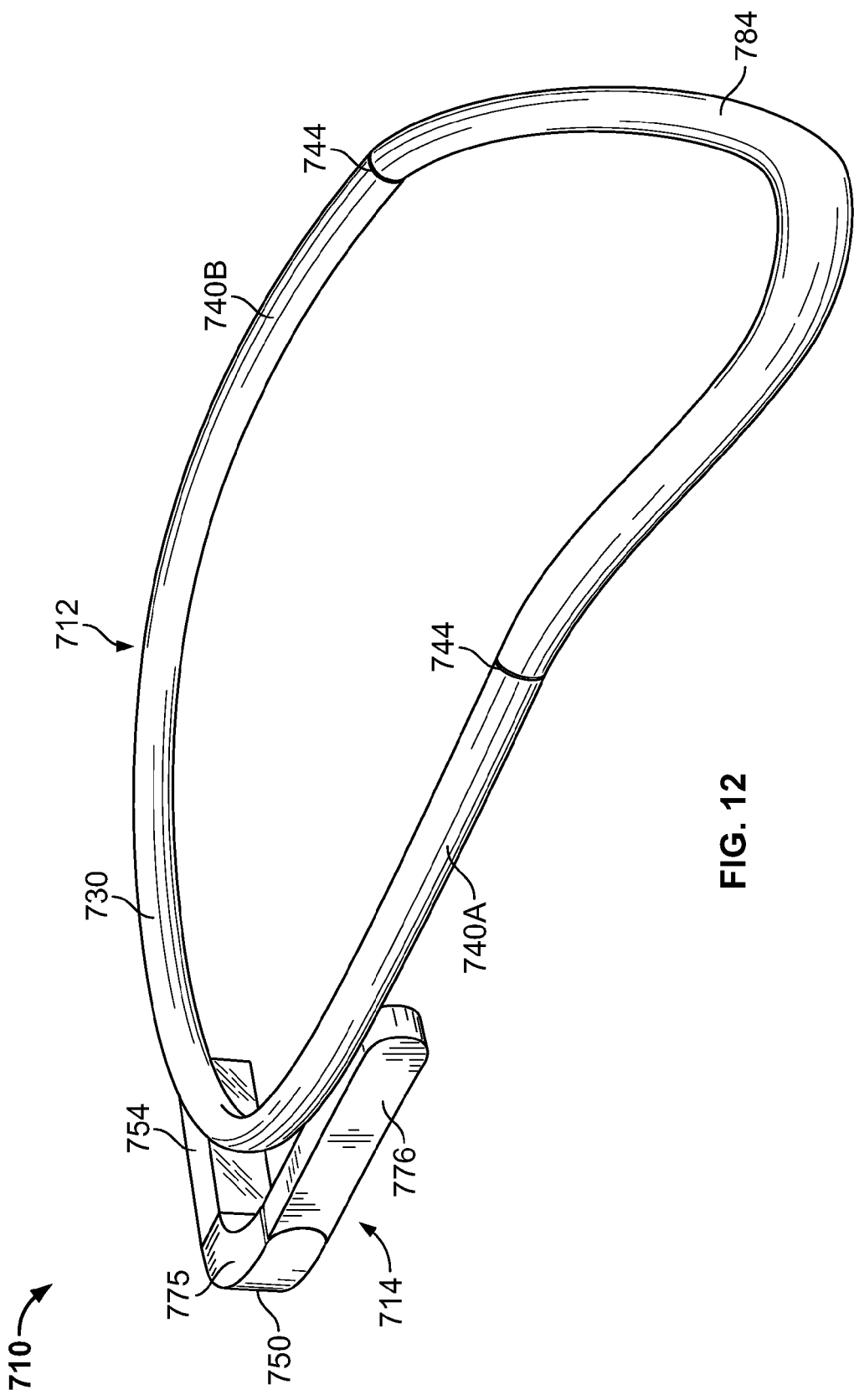
FIG. 12 shows an alternative embodiment of a wearable computer device according to another embodiment of the present disclosure.
Figure 13:
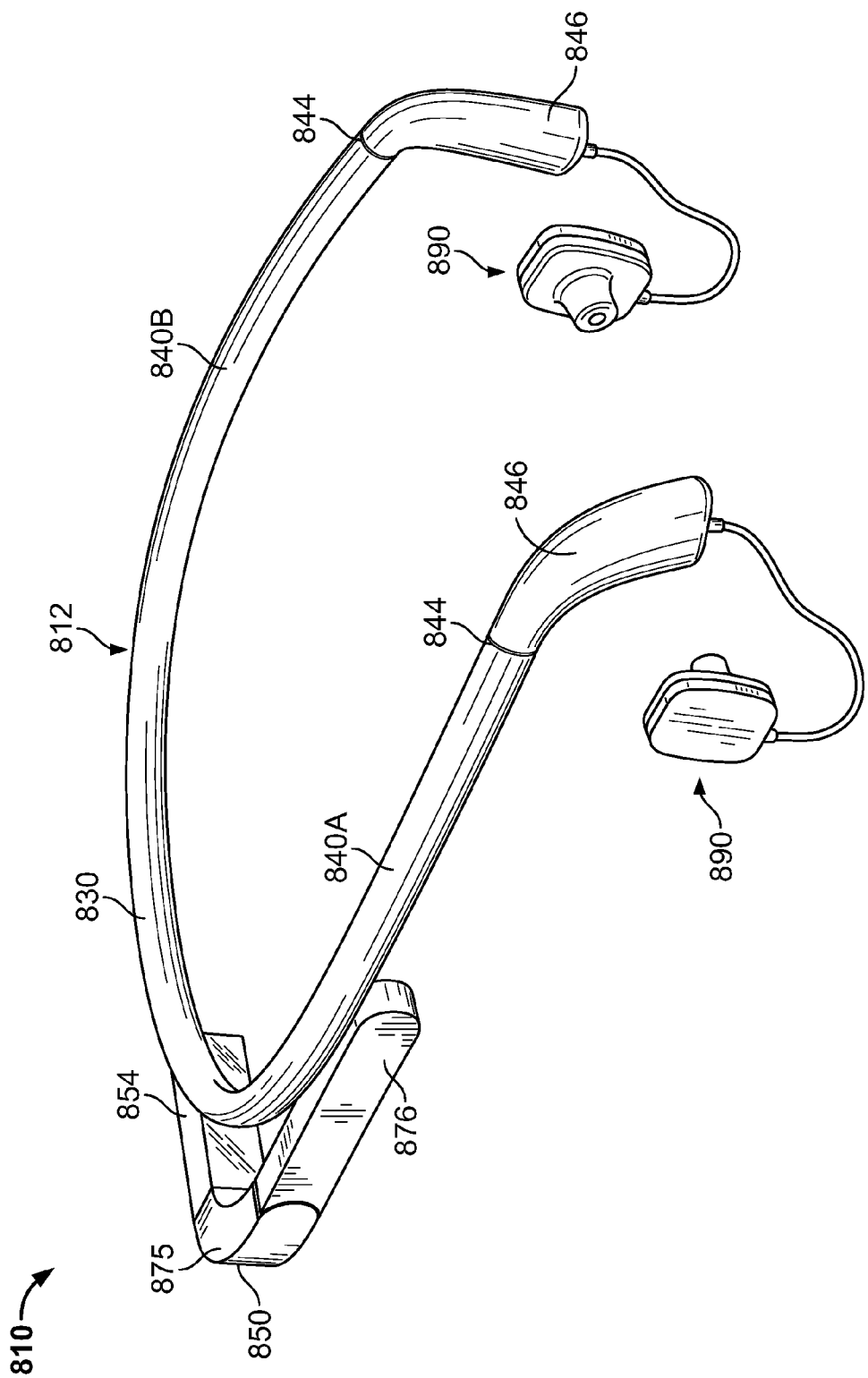
FIG. 13 shows an alternative embodiment of a wearable computer device according to another embodiment of the present disclosure.

Additional components can be included in the various device assemblies described herein. These components can include additional inputs, control circuitry boards, antennae or the like. The various locations in which these additional components are located on or in such a device assembly can also be selected to allow for a predetermined weight distribution. Some examples of additional components are shown in FIGS. 12 and 13. The embodiment of device 710 in FIG. 12 includes a band 612 that wraps entirely around the head of a wearer. In such an embodiment, the wraparound portion 684 can be integrally formed with band 612 or with a portion of band (such as an inner portion 538 shown in FIGS. 9 and 10). Alternatively, wraparound portion 684 can be a separate structure that can be assembled with a band 612 in place of earpieces (such as earpieces 446 in FIG. 5) that can themselves be removably assembled with band 412. Wraparound portion 684 can be configured for a secure fit in contact with the back of a wearer's head to help hold device 610 in position thereon (such as during activities requiring a great deal of movement). Alternatively, wraparound portion 684 can be relatively looser fitting when device 610 is worn in an operational position, allowing the user to remove device 610 from the user's head and continue to wear the device around his or her neck. Wraparound portion 684 can be configured to house one or more batteries to provide electrical current for device 610 and internal connections and wiring for carrying such current. In an example, wraparound portion 684 can house one or more flexible battery structures to allow wraparound portion 684 to bend or flex, such as to conform to the user's head or neck.

FIG. 14 shows an embodiment of device 710 with earphones 790 integrated with band 712. In the embodiment shown, earphones 970 are connected by wires 792 to the end of earpieces 746. This arrangement can allow for earpieces 746 to be swapped with other earpieces discussed herein (such as earpieces 446 in FIG. 5) such that the user can selectively utilize device 710 with or without earphones 790. Earphones 790 can allow device 710 to present audio to the wearer that can, for example be associated with information presented on display 754. In an example, the device 710 can give a vocal request for the user to make a selection from items presented in a list on display 745. Earphones 790 can also allow for music or the like to be played through device 710. Such music can be stored in internal memory of device 710 or can be stored in memory of another connected device such as a smartphone or a computer or can stream to device 710 over the internet. Additionally, the earphones 790 can present the audio from a telephone call transmitted from a phone via Bluetooth™ or the like.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electronic device, comprising:
    a band configured to be worn on the head of a user, the band including a central portion and first and second temple portions extending from opposing sides of the central portion, the central portion being configured to contact a user brow and the temple portions being configured to contact portions of the head of the user near respective ears thereof, wherein the band is configured to flexibly curve inward along the central portion to adjust to contours of the user brow,
    wherein the band includes a resiliently flexible structural shell that at least partially surrounds a pliable inner member and the structural shell is disposed on a side of the band opposite an inner surface of the pliable inner member; and
    an operational unit including:
        a display element;
        a housing having an arm portion affixed to the first temple portion of the band and defining a longitudinal axis, the housing also including an elbow portion defining a display end of the housing and supporting the display element such that the display element extends along a display axis that is angled with respect to the longitudinal axis and such that the display element is positionable over an eye of the user; and
        an image generating device disposed within the housing and configured for generating an image presentable to the user on the display element,
    wherein the display element is generally transparent and configured to overlay the image presentable to the user with a surrounding environment.

2. The device of claim 1, wherein the operational unit further includes an input device affixed to the housing and configured for receiving from the user an input associated with information presentable on the display element.

3. The device of claim 2, wherein the housing of the operational unit defines an outer wall, and wherein the input device includes touch-sensitive circuitry disposed within the housing adjacent to the outer wall, the touch-sensitive circuitry being configured to receive a touch input from the user through the outer wall.

4. The device of claim 3, wherein the touch-sensitive circuitry is disposed behind a portion of the outer wall, and wherein an outside surface of the outer wall includes a texture defined therein in an area that overlies the touch-sensitive circuitry.

5. The device of claim 1, wherein the display axis is angled at between about 80° and 110° with respect to the longitudinal axis.

6. The device of claim 1, wherein the arm portion and the elbow portion are discrete elements rotatably affixed to each other about a rotation axis substantially parallel to the display axis such that the display element is adjustable toward and away from a brow area of the user's head by rotation of the elbow portion relative to the arm portion.

7. The device of claim 6, wherein the rotation axis is positionable such that it aligns with a focal center of the user's eye.

8. The device of claim 7, wherein the display element includes a planar viewing surface, and wherein the rotation of the display element about the focal center of the user's eye is such that the planar viewing surface remains substantially normal to a line extending therefrom to the focal center through a range of adjustment of the display element.

9. The device of claim 1, wherein the arm portion of the housing includes a first track element that is configured to slideably attach with a second track element included on one of the first and second temple portions of the band, and wherein the slidable engagement between the first and second track elements is configured to allow adjustment of the display element toward and away from an eye of the user.

10. The device of claim 1, further including at least one electronic element disposed within an interior cavity of the band, wherein the at least one electronic element is electrically connected with the image generating device of the operational unit.

11. The device of claim 1, wherein each of the first and second temple portions define, respectively, a first end and a second end, and wherein the band is of a flexible structure such that the first end and second end are moveable toward and away from each other to provide a securing force of the first and second temple portions against the respective portions of the head of the user.

12. The device of claim 1, wherein the band includes a flexible outer portion disposed around a more rigid and resiliently flexible structural member.

13. The device of claim 1, wherein the central portion of the band further includes a nosepiece depending therefrom, wherein the portion of the face of the user that the central portion is configured to contact is a portion of the nose of the user, and wherein the nosepiece makes such contact.

14. The device of claim 1, further including a camera having a lens thereof, the camera being attached to the operational unit such that the lens of the camera is exposed on the housing within the elbow portion thereof and is directed substantially parallel to the longitudinal axis.

15. The device of claim 14, wherein the operational unit includes a button configured to receive from the user an input to direct the device to capture an image using the camera.

16. The device of claim 15, wherein the button is positioned on the housing such that it is configured to be activated by the user by applying a pinching motion to the housing including contact with the button.

17. The device of claim 1, further including a camera having a lens thereof, the camera being attached to the band such that the lens of the camera is exposed thereon and is directed substantially parallel to the longitudinal axis.

18. The device of claim 1, further including a plurality of cameras having respective lenses thereof, the cameras being attached to the band in an array thereof extending over a length of the band.

19. The device of claim 1, further including an audio output device configured for contact with a portion of one of the user's ears and to deliver an audio output of the device thereto, wherein the audio output device is affixed to one of the temple portions of the band.

20. An electronic device, comprising:
a band configured to be worn on the head of a user, the band including a central portion and first and second temple portions extending from opposing sides of the central portion to respective ends thereof, the central portion being configured to contact a user brow and the temple portions being configured to contact portions of the head of the user near respective ears thereof, the band further including an electronics housing affixed on the end of the first temple portion and having a portion that is configured to extend around at least a portion of the respective ear of the user, the electronics housing containing an electronic element therein, wherein the band is configured to flexibly curve inward along the central portion to adjust to contours of the user brow,
wherein the band includes a resiliently flexible structural shell that at least partially surrounds a pliable inner member and the structural shell is disposed on a side of the band opposite an inner surface of the pliable inner member; and
an operational unit including a display element, a housing having an arm portion affixed to the first temple portion of the band and defining a longitudinal axis, the housing also including an elbow portion defining a display end of the housing and supporting the display element such that the display element extends along a display axis that is angled with respect to the longitudinal axis and such that the display element is positionable over an eye of the user, and an image generating device disposed within the housing and configured for generating an image presentable to the user on the display element, the image generating device being electrically connected with the electronic element of the band,
wherein the display element is generally transparent and configured to overlay the image presentable to the user with a surrounding environment.

21. The device of claim 20, wherein the electronic element includes conductive connections configured for connecting with a battery, and wherein the conductive connections are further configured to supply current from the battery to the image generating device.

22. The device of claim 20, wherein the operational unit further includes an input device affixed to the housing, and wherein the input device is also electrically connected with the at least one electronic element of the band.

23. The device of claim 20, wherein the operational unit is positioned on a first side of the respective ear of the user such that it has a center of mass at a point disposed on the first side of the ear, and wherein the electronics housing is configured to extend around at least a portion of the same ear of the user, the electronics housing being configured to have a center of mass at a point disposed on a second side of the ear of the user.

24. The device of claim 23, wherein the electronics housing is further configured such that an overall weight of the device, when being worn by the user, is distributed among the portion of the face of the user and the ear of the user such that a greater portion of the overall weight is applied to the ear.

25. The device of claim 20, wherein the electronic element includes electronic circuitry configured to perform a function associated with the device.

26. An electronic device, comprising:
a band configured to be worn on the head of a user, the band including a central portion and first and second temple portions extending from opposing sides of the central portion, the central portion being configured to contact a user brow and the temple portions being configured to contact portions of the head of the user near respective ears thereof, wherein the band is configured to flexibly curve inward along the central portion to adjust to contours of the user brow,
wherein the band includes a resiliently flexible structural shell that at least partially surrounds a pliable inner member and the structural shell is disposed on a side of the band opposite an inner surface of the pliable inner member; and
an operational unit including:

a display element;

a housing having an arm portion affixed to the band and defining a longitudinal axis and an outer wall, the housing also including an elbow portion defining a display end of the housing and supporting the display element such that the display element extends along a display axis that is angled with respect to the longitudinal axis and such that the display element is positionable over an eye of the user;

an image generating device disposed within the housing and configured for generating an image presentable to the user on the display element; and touch-sensitive circuitry disposed within the housing adjacent to the outer wall, the touch-sensitive circuitry being configured to receive a touch input from the user through the outer wall, the input being associated with information presentable on the display element, wherein the display element is generally transparent and configured to overlay the image presentable to the user with a surrounding environment.

* * * * *